(12) United States Patent
Kato et al.

(10) Patent No.: US 9,752,061 B2
(45) Date of Patent: Sep. 5, 2017

(54) ADHESIVE SHEET AND METHOD FOR MANUFACTURING ADHESIVE SHEET

(71) Applicants: LINTEC CORPORATION, Itabashi-ku (JP); NIPPON PAINT CO., LTD., Osaka-shi (JP); NIPPON FINE COATINGS, INC., Shinagawa-ku (JP)

(72) Inventors: Kiichiro Kato, Saitama (JP); Yumiko Amino, Funabashi (JP)

(73) Assignees: LINTEC CORPORATION, Itabashi-ku (JP); NIPPON PAINT CO., LTD., Osaka-shi (JP); NIPPON FINE COATINGS, INC., Shinagawa-ku (JP)

( * ) Notice: Subject to any disclaimer, the term of this patent is extended or adjusted under 35 U.S.C. 154(b) by 0 days.

(21) Appl. No.: 14/430,996

(22) PCT Filed: Sep. 27, 2013

(86) PCT No.: PCT/JP2013/076406
§ 371 (c)(1),
(2) Date: Mar. 25, 2015

(87) PCT Pub. No.: WO2014/051106
PCT Pub. Date: Apr. 3, 2014

(65) Prior Publication Data
US 2015/0247064 A1    Sep. 3, 2015

(30) Foreign Application Priority Data
Sep. 28, 2012    (JP) .................................. 2012-218226

(51) Int. Cl.
*B32B 7/12* (2006.01)
*C09J 7/02* (2006.01)
(Continued)

(52) U.S. Cl.
CPC .............. *C09J 7/0246* (2013.01); *B05D 1/34* (2013.01); *B32B 5/18* (2013.01); *B32B 27/20* (2013.01);
(Continued)

(58) Field of Classification Search
CPC .. C09J 7/02; C09J 7/0246; B32B 5/18; B32B 27/20
See application file for complete search history.

(56) References Cited

U.S. PATENT DOCUMENTS

2008/0226884 A1    9/2008    Sim et al.
2009/0244703 A1*  10/2009    Asakura .................. B29C 41/28
                                                              359/485.01
2012/0282455 A1   11/2012    Hao et al.

FOREIGN PATENT DOCUMENTS

EP    1 970 422 A2    9/2008
JP    59-90980 U       6/1984
(Continued)

OTHER PUBLICATIONS

Translation of JP 2012-197332.*
(Continued)

*Primary Examiner* — Victor Chang
(74) *Attorney, Agent, or Firm* — Oblon, McClelland, Maier & Neustadt, L.L.P.

(57)    ABSTRACT

Provided is an adhesive sheet comprising a support substrate, an adhesive agent layer (X), a continuous void-containing layer composed of a composition containing an adhesive agent and silica particles, and an adhesive agent layer (Y) that are laminated in this order, wherein the adhesive sheet that has a content by mass of the silica particles in the continuous void-containing layer of 25 to 60%; and when affixed to a surface of various plastic molded articles, the adhesive sheet prevents swelling or lifting, in other words, blistering after a lapse of time, to allow the (Continued)

surface of its support substrate to be smooth and to have an excellent appearance, wherein the adhesive sheet can exhibit excellent blister resistance regardless of the type of adhesive agent, and is furthermore easy to manufacture.

20 Claims, 1 Drawing Sheet

(51) Int. Cl.
    *B32B 27/20*     (2006.01)
    *B05D 1/34*     (2006.01)
    *B32B 5/18*     (2006.01)
    *C09J 5/00*     (2006.01)
    *C08K 3/36*     (2006.01)
    *C09J 133/00*     (2006.01)

(52) U.S. Cl.
    CPC ............... *C09J 5/00* (2013.01); *C09J 7/0207* (2013.01); *B32B 2264/102* (2013.01); *B32B 2405/00* (2013.01); *C08K 3/36* (2013.01); *C09J 133/00* (2013.01); *C09J 2201/36* (2013.01); *C09J 2201/606* (2013.01); *C09J 2205/102* (2013.01); *C09J 2400/10* (2013.01); *C09J 2433/00* (2013.01); *C09J 2467/006* (2013.01); *Y10T 156/10* (2015.01); *Y10T 428/249983* (2015.04)

(56) References Cited

FOREIGN PATENT DOCUMENTS

| | | | |
|---|---|---|---|
| JP | 1-115982 | 5/1989 | |
| JP | 2-3481 | 1/1990 | |
| JP | 7-26215 | 1/1995 | |
| JP | 8-3521 | 1/1996 | |
| JP | 10-279900 | 10/1998 | |
| JP | 10-310754 | 11/1998 | |
| JP | 2001-335766 | 12/2001 | |
| JP | 2001-354745 | 12/2001 | |
| JP | 2003-531253 | 10/2003 | |
| JP | 2005-200499 | 7/2005 | |
| JP | 2012-197332 | 10/2012 | |
| WO | WO8603767 | * 7/1986 | ................ C09J 7/02 428/40.1 |
| WO | WO 2011/068754 A1 | 6/2011 | |

OTHER PUBLICATIONS

Extended European Search Report issued Apr. 4, 2016 in Patent Application No. 13841552.6.
International Search Report issued Dec. 24, 2013, in PCT/JP2013/076406, filed Sep. 27, 2013.

* cited by examiner

ADHESIVE SHEET AND METHOD FOR MANUFACTURING ADHESIVE SHEET

TECHNICAL FIELD

The present invention relates to an adhesive sheet, and more specifically, to a blister-resistant adhesive sheet that, when affixed to surface of various plastic molded articles, prevents blistering such as swelling or lifting and allows the surface of its support substrate to be smooth and to have an excellent appearance.

BACKGROUND ART

Adhesive sheets having a support substrate applied a pressure-sensitive adhesive (adhesive agent) thereto have been conventionally used in a wide variety of fields because of its simplicity, specifically, because the sheets are easy to affix on adherends by pressing force. Meanwhile, plastic molded articles have been frequently used in recent years in accordance with the needs for lighter products. With this, use of adhesive sheets to be affixed on plastic molded articles has increased. Examples of the plastic molded article include those molded from resins such as polycarbonate, polymethyl methacrylate, polystyrene, and ABS.

When an adhesive sheet that has a support substrate having gas barrier properties (for example, an adhesive label) is affixed on the surfaces of such a plastic molded article for ornamentation and the like, gas may be generated from the plastic molded article to form air bubbles between the adhesive sheet and the plastic molded article, and thus swelling or lifting, that is, blisters may occur. Occurrence of such blisters impairs the appearance of the labels and significantly reduces the ornamental function as adhesive sheets.

To solve such problems, Patent Literature 1, for example, discloses an acrylic adhesive agent composition, as the adhesive agent composition, containing a copolymer prepared by radically polymerizing a (meth)acrylic acid ester, a carboxyl group-containing compound that can copolymerize, and a tertiary amine having a vinyl group.

Patent Literature 2 suggests a blister-resistant adhesive sheet using an adhesive agent prepared by blending an aziridine-based crosslinking agent to a copolymer of an acrylic acid ester having an alkyl group having 4 to 12 carbon atoms and 0.1 to 10% by weight of a polar monomer such as acrylic acid or 2-hydroxyethyl acrylate.

Additionally, Patent Literature 3 discloses an adhesive sheet that contains, as the components for forming an adhesive agent layer, an adhesive agent component and a curable component that is an acrylic monomer or oligomer. The curable component, however, may reduce the cohesive force of the adhesive agent layer, or may make the adhesive agent layer whitely turbid if having poor compatibility with the adhesive agent component.

Furthermore, Patent Literature 4 discloses an adhesive agent composition prepared by blending a resin composition having a specific molecular weight obtained by copolymerizing an alkyl(meth)acrylate ester having 1 to 12 carbon atoms and a carboxyl group-containing unsaturated monomer, with a resin composition having a specific Tg and a specific molecular weight obtained by copolymerizing one or more monomers selected from an alkyl(meth)acrylic acid ester or cycloalkyl(meth)acrylic acid ester having 1 to 20 carbon atoms, benzyl methacrylate, or styrene with an amino group-containing unsaturated monomer.

Furthermore, Patent Literature 5 discloses a blister-resistant adhesive agent composition prepared by blending a crosslinking agent having a glycidyl group to a copolymer having a specific molecular weight obtained by copolymerizing an alkyl(meth)acrylic acid ester having 1 to 12 carbon atoms as the main component, a styrenic monomer, a carboxyl group-containing unsaturated monomer, and an amino group-containing unsaturated monomer.

Patent Literature 6 discloses a resin composition polymerized in acetone and having a weight average molecular weight of 1.5 million or more and a ratio of the weight average molecular weight/the number average molecule weight of 4.0 or less.

CITATION LIST

Patent Literature

PTL 1: Japanese Patent Laid-Open No. 2-3481
PTL 2: Japanese Patent Laid-Open No. 8-3521
PTL 3: Japanese Patent Laid-Open No. 10-279900
PTL 4: Japanese Patent Laid-Open No. 10-310754
PTL 5: Japanese Patent Laid-Open No. 2001-335766
PTL 6: Japanese Patent Laid-Open No. 2001-354745

SUMMARY OF INVENTION

Technical Problem

Unfortunately, any techniques described in Patent Literatures 1 to 6 mentioned above have limitations on the compositions of adhesive agents, the types of crosslinking agents, molecular weights and the like, with the result that applicable adhesive agents are limited, and have a problem of difficulty to satisfy both of adhesive properties required for label applications and blister-resistance.

Under such situations, it is an object of the present invention to provide an adhesive sheet that, when affixed to the surface of various plastic molded articles, prevents swelling or lifting, in other words, blistering after a lapse of time to allow the surface of its support substrate to be smooth and to have an excellent appearance, wherein the adhesive sheet can exhibit excellent blister resistance regardless of the type of adhesive agent, and is furthermore easy to manufacture.

Solution to Problem

The present inventors have extensively studied to solve the problem and found that the problem can be solved by an adhesive sheet including a support substrate, an adhesive agent layer, a continuous void-containing layer composed of a composition containing an adhesive agent and silica particles, and an adhesive agent layer that are laminated in this order, wherein the content by mass of the silica particles in the continuous void-containing layer is in a specific range. The present invention has been completed based on these findings.

In other words, the present invention provides:
(1) An adhesive sheet comprising a support substrate, an adhesive agent layer (X), a continuous void-containing layer composed of a composition containing an adhesive agent and silica particles, and an adhesive agent layer (Y) that are laminated in this order, wherein a content by mass of the silica particles in the continuous void-containing layer is from 25 to 60%;

(2) the adhesive sheet according to (1) above, wherein an increment in thickness due to voids of the continuous void-containing layer is from 120 to 170%;

(3) the adhesive sheet according to (1) or (2) above, wherein the silica particles that are a material forming the continuous void-containing layer have a volume-average secondary particle size of 0.5 to 10 μm;

(4) a method for manufacturing an adhesive sheet according to (1) to (3) above comprising a support substrate, an adhesive agent layer (X), a continuous void-containing layer, and an adhesive agent layer (Y) that are laminated in this order, wherein at least two or more of the adhesive agent layer (X), the continuous void-containing layer, and the adhesive agent layer (Y) are simultaneously applied by a multi-layer coater; and (5) a method for manufacturing an adhesive sheet according to (1) to (3) above comprising a support substrate, an adhesive agent layer (X), a continuous void-containing layer, and an adhesive agent layer (Y) that are laminated in this order, wherein the adhesive agent layer (X), the continuous void-containing layer, and adhesive agent layer (Y) are each laminated by bonding.

Advantageous Effects of Invention

The adhesive sheet of the present invention has a layer structure including a support substrate, an adhesive agent layer (X), a continuous void-containing layer containing an adhesive agent and silica particles in a specific proportion, and an adhesive agent layer (Y) that are laminated in this order. The present invention thus can provide an adhesive sheet that has a support substrate whose surface is smooth and has an excellent appearance, and that exhibits excellent blister resistance regardless of the type of adhesive agent, wherein the adhesive sheet also has water resistance and solvent resistance comparable to adhesive sheets containing no silica particles, and is easy to manufacture.

DESCRIPTION OF EMBODIMENTS

An adhesive sheet of the present invention will be described first.

The adhesive sheet of the present invention is an adhesive sheet including a support substrate, an adhesive agent layer (X), a continuous void-containing layer composed of a composition containing an adhesive agent and silica particles, and an adhesive agent layer (Y) that are laminated in this order, wherein the content by mass of the silica particles in the continuous void-containing layer is from 25 to 60%.

[Support Substrate]

The support substrate used in the adhesive sheet of the present invention is not particularly limited, and various substrates conventionally used as the support substrate in adhesive sheets can be used. Example of the such support substrate include plastic films such as polyester films including polyethylene terephthalate films, polybutylene terephthalate films, and polyethylene naphthalate films, polyethylene films, polypropylene films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyphenylene sulfide films, polyether imide films, polyimide films, fluorine resin films, polyamide films, acrylic resin films, norbornene-based resin films, and cycloolefin resin films.

Of these, polyethylene terephthalate films are preferable. Polyethylene naphthalate films, polyimide films, and polyether imide films, which have a high glass transition point (Tg), can be used in applications requiring heat resistance and the like. Furthermore, polyvinyl chloride films, polyvinylidene chloride films, fluorine resin films, and acrylic resin films, which have weatherability, can be used in applications requiring weatherability and the like.

The thickness of this plastic film is not particularly limited, and is usually from about 5 to about 200 μm, preferably from 25 to 120 μm, more preferably from 30 to 90 μm, and still more preferably from 40 to 60 μm.

[Metal Layer]

The support substrate in the present invention is preferably a non-breathable substrate, which further clearly exerts an effect of the present invention to prevent blisters.

An example of this non-breathable substrate that can be used includes a substrate having a metal layer on the plastic film aforementioned. Examples of the method for forming the metal layer that can be employed include a method for depositing, for example, a metal having metal luster, specifically aluminum, tin, chromium, and titanium by a PVD method such as vacuum deposition, sputtering, and ion plating, or a method for affixing metal foil having metal luster, specifically aluminum foil, tin foil, chromium foil, and titanium foil via one of various adhesive agent layers usually used. Particularly, the method for depositing a metal having metal luster is advantageous from the viewpoints of the appearance and cost effectiveness of an adhesive sheet to be obtained.

In order to improve the adhesion properties with a layer to be mounted on the surface, these plastic films also can be subjected to surface treatment by an oxidation method or a roughening method or primer treatment as required. Examples of the oxidation method aforementioned include corona discharge treatment, plasma discharge treatment, chromium acid treatment (wet type), hot-air treatment, and ozone and ultraviolet irradiation treatment. Examples of the roughening method include sandblast method and solvent treatment. Such surface treatment is arbitrarily selected depending on the type of plastic film. In terms of effects, handleability and the like, corona discharge treatment is preferably used in general.

[Continuous Void-Containing Layer]

A continuous void-containing layer constituting an adhesive sheet of the present invention (sometimes simply referred to as a void-containing layer hereinbelow) is a layer composed of a composition containing an adhesive agent and silica particles, wherein the content by mass of the silica particles in the void-containing layer is necessarily from 25 to 60%, preferably from 28 to 55%, more preferably from 30 to 55%, still more preferably from 30 to 50%, and further still more preferably from 35 to 45%. A content by mass of the silica particles aforementioned of less than 25% cannot provide voids, and may result in insufficient blister resistance. On the other hand, a content by mass of more than 60% may reduce the film strength to thereby cause the following problems: the water resistance and chemical resistance are reduced; and, pressing force in affixing an adhesive sheet may make a dent to cause a defective appearance.

It is to be noted that the content by mass of the silica particles in the void-containing layer can be calculated by the following expression (2);

Content by mass of the silica particles=[mass of the silica particles/total mass of the continuous void-containing layer]×100 (2)

[Increment in Thickness Due to Voids]

The increment in thickness due to voids of the void-containing layer is preferably from 120 to 170%, more preferably from 130 to 165%, still more preferably from 130 to 160%, further still more preferably from 135 to 150%, and further still more preferably from 135 to 145%.

An increment in thickness due to the voids of 120% or more allows gas generated from plastic molded articles and the like to be easier to escape and makes the blister resistance of the adhesive sheet excellent. On the other hand, an increment in thickness of 170% or less makes the film strength higher and the water resistance and chemical resistance excellent.

[Method for Calculating the Increment in Thickness Due to Voids]

The increment in thickness due to voids of the void-containing layer can be calculated as follows.

First, the measurement of the amount applied is divided by the specific gravity of the dried coating film to calculate the film thickness containing no bubbles (underlined part). The measured film thickness is divided by the calculated film thickness as in the following expression (1) to calculate the increment in thickness due to voids.

Increment in thickness due to voids (%)=Measured film thickness×100/(amount applied/specific gravity of the dried coating film) (1)

It is to be noted that a measured film thickness is a value of the thickness of the void-containing layer measured with a constant pressure thickness gauge (manufactured by TECLOCK Corporation, product name "PG-02") in conformity with JIS K 7130. The amount applied is the dry mass of the void-containing layer per unit area (g/m$^2$). The specific gravity of the dry coating film (g/cm$^3$) is a value calculated from the mass fraction of the specific gravity of each material.

[Voids]

Silica particles that are a material to form the continuous void-containing layer are in fact constituted of secondary particles. The voids in the continuous void-containing layer thus include, in addition to the voids existing between the secondary particles, voids existing in the secondary particles. Accordingly, the continuous void-containing layer has a region where voids existing between the secondary particles communicate with voids existing in the secondary particles to form holes (micropores) toward the thickness direction.

[Silica Particles]

Silica particles that are a material to form the void-containing layer may be any of dry silica, wet silica, or organically modified silica, or may be a mixture of two or more of these. The content by mass of the silica in the silica particles is preferably from 70 to 100% by mass, more preferably from 85 to 100% by mass, and still more preferably from 90 to 100% by mass. The volume-average secondary particle size of the silica particles that are a material to form the void-containing layer is preferably from 0.5 to 10 µm, more preferably from 1 to 8 µm, and still more preferably from 1.5 to 5 µm. The volume-average secondary particle size of the silica particles can be determined by measuring the particle size distribution using Multisizer 3 (manufactured by Beckman Coulter, Inc.) and the like in accordance with the Coulter counter method.

It is to be noted that the void-containing layer may contain, together with the silica particles, other inorganic particles such as titanium oxide, barium sulfate, alumina, calcium carbonate, magnesium carbonate, and glass beads, and furthermore, organic particles such as acrylic beads as long as not impairing the object of the present invention.

[Adhesive Agent]

The continuous void-containing layer contains an adhesive agent as a component. The reasons are that adhesion properties at the interface between the continuous void-containing layer and the adhesive agent layer are easily obtainable, and that a material having adhesiveness can easily achieve larger adhesive strength to an adherend than a material having no adhesiveness due to the influence of bulk consequently when both materials have the same thickness.

The adhesive agent to constitute the continuous void-containing layer is not particularly limited, and examples of the adhesive agent that can be used include various types of adhesive agent such as rubber-based adhesive agents, silicone-based adhesive agents, and acrylic adhesive agents. From the viewpoints of the performance of the adhesive agent and the weatherability, acrylic adhesive agents are preferable. Additionally, the adhesive agent may be either of a solvent form or an emulsion form. It is to be noted that a solvent adhesive agent may contain a crosslinking agent as necessary.

The acrylic adhesive agent preferably contains a crosslinking agent as an adhesive component together with a (meth)acrylic acid ester copolymer having a weight average molecular weight of 100000 to 1500000. From the viewpoint of the porosity, the storage shear modulus of the adhesive agent after crosslinking at 100° C. is preferably $9.0 \times 10^3$ Pa or more, more preferably $1.0 \times 10^4$ Pa or more, and still more preferably $0.0 \times 10^4$ Pa or more. A storage shear modulus of $9.0 \times 10^3$ Pa or more allows voids to remain, and thus the blister resistant will be excellent.

The storage shear modulus can be determined by measurement using a viscoelasticity measuring apparatus (manufactured by Rheometrics, Inc., apparatus name: DYNAMIC ANALYZER RDA II) at a frequency of 1 Hz.

Additionally, from the viewpoint of the adhesion properties of the interface between the continuous void-containing layer and the adhesive agent layer, the adhesive agent used as the adhesive agent constituting the continuous void-containing layer is preferably the same as used in the adhesive agent layer described below.

Examples of the crosslinking agent include polyisocyanate compounds, epoxy resins, melamine resins, urea resins, dialdehydes, methylol polymers, aziridine-based compounds, metal chelate compounds, metal alkoxides, and metal salts, and a polyisocyanate compounds are preferably used. This crosslinking agent can be blended with respect to 100 parts by mass of the solid content of the (meth)acrylic acid ester copolymer aforementioned in an amount of preferably 0 to 30 parts by mass, more preferably 1 to 15 parts by mass, still more preferably 2 to 10 parts by mass, and further still more preferably 3 to 7 parts by mass.

Examples of the polyisocyanate compounds here include aromatic polyisocyanates such as tolylene diisocyanate, diphenylmethane diisocyanate, and xylylene diisocyanate, aliphatic polyisocyanates such as hexamethylene diisocyanate, alicyclic polyisocyanates such as isophorone diisocyanate and hydrogenated diphenylmethane diisocyanate, and biuret products and isocyanurate products thereof, as well as adduct products that are reaction products from reaction with a low-molecular active hydrogen-containing compound such as ethylene glycol, propylene glycol, neopentyl glycol, trimethylolpropane, and castor oil. These crosslinking agents may be used singly or in combination of two or more thereof.

The thickness of the continuous void-containing layer is preferably from 5 to 100 µm, more preferably from 7 to 50 µm, still more preferably from 10 to 30 µm, and further still more preferably from 15 to 25 µm. When the thickness is 5 µm or more, a sufficient thickness for embedding silica particles can be secured, and a continuous void-containing layer having lower roughness can be formed. Blister resistance also can be secured. A thickness of 100 µm or less is economically preferable because the water resistance is not impaired, and the amount of the silica particles used also can be reduced.

The continuous void-containing layer is formed by applying a coating liquid for a continuous void-containing layer, the coating liquid containing the adhesive agent and the silica particles.

[Adhesive Agent Layers (X) and (Y)]

Figure 1:
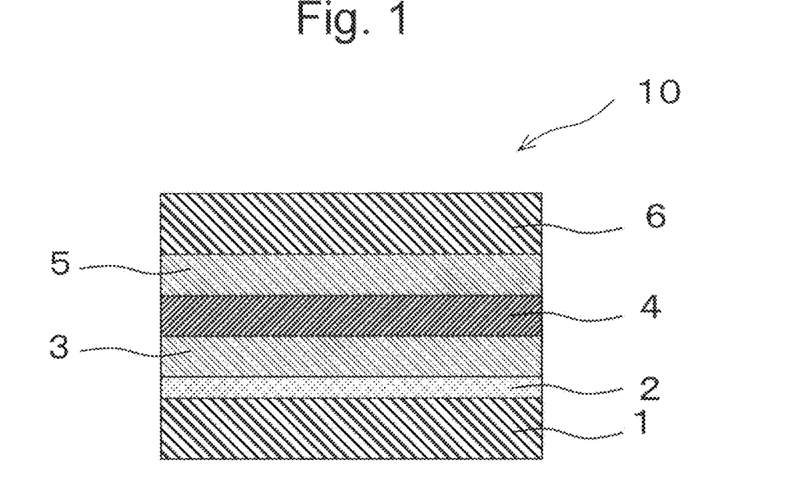
FIG. 1 is a cross-sectional schematic view of an example of the structure of an adhesive sheet according to the present invention.

FIG. 1 is a cross-sectional schematic view of an example of the structure of an adhesive sheet according to the present invention. As shown in FIG. 1, an adhesive sheet 10 of the present invention has a structure in which a support substrate 1 having a metal layer 2 on the surface, an adhesive agent layer (X) 3 on the metal layer 2, the continuous void-containing layer 4 aforementioned, an adhesive agent layer (Y) 5, and a release sheet 6 are laminated in this order.

The adhesive agent constituting the adhesive agent layer (X) and the adhesive agent layer (Y) in the adhesive sheet of the present invention is not particularly limited because the adhesive agent layer itself requires no blister-resistant function. Although various types of adhesive agent such as rubber-based adhesive agents, silicone-based adhesive agents, and acrylic adhesive agents can be used, acrylic adhesive agents are preferable from the viewpoints of the performance of the adhesive agent and the weatherability. Additionally, the adhesive agent may be either of a solvent form or an emulsion form. It is to be noted that a crosslinking agent may be contained as necessary.

The thickness of the adhesive agent layer (X) and the adhesive agent layer (Y) in the adhesive sheet of the present invention is preferably from 5 to 50 µm, more preferably from 7 to 35 µm, and further still more preferably from 10 to 30 µm.

The ratio between the thickness of the adhesive agent layer (X) and the thickness of the continuous void-containing layer [adhesive agent layer (X)/continuous void-containing layer] is preferably from 0.05 to 10, more preferably from 0.1 to 5, still more preferably from 0.2 to 2, and further still more preferably from 0.3 to 0.8 from the viewpoint of satisfying both of an excellent appearance and blister resistance.

The ratio between the thickness of the adhesive agent layer (Y) and the thickness of the continuous void-containing layer [adhesive agent layer (Y)/continuous void-containing layer] is preferably from 0.05 to 10, more preferably from 0.1 to 5, still more preferably from 0.2 to 2, and further still more preferably from 0.3 to 0.8 from the viewpoint of satisfying both of an excellent appearance and blister resistance.

These two adhesive agent layers (X) and (Y) may have the same composition or different compositions. The composition of the adhesive agent layer is not particularly limited. The adhesive agent same as used in the continuous void-containing layer aforementioned may be used.

Methods for manufacturing an adhesive sheet of the present invention will be now described.

[Method for Manufacturing an Adhesive Sheet I]

The method for manufacturing an adhesive sheet I of the present invention is a method for manufacturing an adhesive sheet including a support substrate, an adhesive agent layer (X), a continuous void-containing layer, and an adhesive agent layer (Y) that are laminated in this order, wherein the method is characterized in that at least two or more of the adhesive agent layer (X), the continuous void-containing layer, and the adhesive agent layer (Y) are simultaneously applied by a multi-layer coater.

In the manufacturing method I, examples of the coater used in simultaneous application by a multi-layer coater include curtain coaters and die coaters. Of these, die coaters are suitable in terms of handleability.

[Method for Manufacturing an Adhesive Sheet II]

The method for manufacturing an adhesive sheet II of the present invention is a method for manufacturing an adhesive sheet including a support substrate, an adhesive agent layer (X), a continuous void-containing layer, and an adhesive agent layer (Y) that are laminated in this order, wherein the method is characterized in that the adhesive agent layer (X), the continuous void-containing layer, and the adhesive agent layer (Y) are each laminated by bonding.

In the manufacturing method II, examples of the method of laminating by bonding that can be used include a method comprising applying and drying a predetermined adhesive agent on a peeling-treated surface of a release sheet in accordance with a conventionally known method such that the thickness after drying reaches preferably 5 to 50 µm, more preferably 7 to 35 µm, and further still more preferably 10 to 30 µm to fabricate an adhesive agent sheet having a release sheet, and subsequently bonding this sheet to a continuous void-containing layer using a laminating roll.

In the manufacturing method II, examples of the coater used in forming and applying each layer include air knife coaters, blade coaters, bar coaters, gravure coaters, roll coaters, roll knife coaters, curtain coaters, die coaters, knife coaters, screen coaters, Meyer bar coaters, and kiss coaters. Of these, in terms of handleability, roll knife coaters and die coaters are suitable.

Alternatively, it is also possible to use a manufacturing method described below, in other words, a method for manufacturing an adhesive sheet including a support substrate, an adhesive agent layer (X), a continuous void-containing layer, and adhesive agent layer (Y) that are laminated in this order, wherein at least two layers of the adhesive agent layer (X), the continuous void-containing layer, and the adhesive agent layer (Y) are laminated by a wet-on-wet or wet-on-dry process, which is not multi-layer simultaneous application.

It is to be noted that the wet-on-wet process is a method that includes applying, for example, a coating liquid for forming an adhesive agent layer (X) and further applying a coating liquid for forming a continuous void-containing layer thereon without dry treatment.

In contrast, the wet-on-dry process is a method that includes applying, for example, a coating liquid for forming an adhesive agent layer (X), applying a coating liquid for forming a continuous void-containing layer thereon, carrying out dry treatment, and then, applying a coating liquid for forming an adhesive agent layer (Y).

Alternatively, it is also possible to use an method that includes fabricating a substrate-less adhesive sheet having an adhesive agent layer (X), a continuous void-containing layer, and adhesive agent layer (Y) that are laminated in this order, and laminating a support substrate thereafter. In this case, the substrate-less adhesive sheet may have a release sheet as described later for protecting the adhesive agent layer.

(Release Sheet)

Examples of the substrate of the release sheet used in the method for fabricating an adhesive sheet aforementioned include films formed from various resins such as polyethylene terephthalate, polybutylene terephthalate, polyethylene, polypropylene, and polyacrylate, or various paper materials such as polyethylene-laminated paper, polypropylene-laminated paper, clay-coated paper, resin-coated paper, glassine paper, and high-quality paper. Such a substrate can be used as a release sheet, after subjected to peeling treatment as necessary on its surface to be bonded to an adhesive agent layer.

Examples of the peeling treatment include formation of a peeling agent layer composed of a peeling agent such as silicone-based resins, long-chain alkyl-based resins, and fluorine-based resins. Although the thickness of the release sheet is not particularly limited, it is usually from 20 to 200 μm, preferably from 25 to 180 μm, and more preferably from 50 to 170 μm.

The adhesive sheet of the present invention thus obtained is affixed to plastic molded articles of polycarbonate, polymethyl methacrylate, polystyrene, ABS resins, and the like to thereby enable effective prevention of blistering.

EXAMPLES

The present invention now will be described by Examples in further detail, but the present invention is not limited by these Examples in any way.

It is to be noted that the blister resistance and water resistance of the adhesive sheet obtained in each example were determined by the methods described below.

<Evaluation of the Blister Resistance>

Adhesive sheets having a size of 50 mm×50 mm, from which the release sheet had been peeled off, were pressure-bonded to a polymethyl methacrylate plate [manufactured by MITSUBISHI RAYON CO., LTD., "ACRYLITE" L001"], a polycarbonate plate [manufactured by MITSUBISHI GAS CHEMICAL COMPANY, INC., "Iupilon Sheet NF-2000VU"], and a polystyrene plate [manufactured by KYOEI JUSHI Corporation, "Dialite 201B W1001"] each having a thickness of 2 mm and a size of 70 mm×150 mm using a squeegee. After left at 23° C. for 12 hours, these plates were left in a hot-air dryer at 80° C. for 1.5 hours, and then, in a hot-air dryer at 90° C. for 1.5 hours. The blistering condition after heating acceleration was observed and evaluated according to the decision criteria below.

A: No blister was visually confirmed at all.
B: Blisters were visually confirmed partially.
C: Blisters were visually confirmed across the entire surface.

<Evaluation of the Water Resistance>

An adhesive sheet having a size of 50 mm×50 mm, from which the release sheet was peeled off, was pressure-bonded to a polymethyl methacrylate plate [manufactured by MITSUBISHI RAYON CO., LTD., "ACRYLITE" L001] having a thickness of 2 mm and a size of 70 mm×150 mm using a squeegee. After left at 23° C. for 12 hours, the plate was immersed in warm water at 40° C. for 24 hours, and then the water immersion condition was observed and evaluated according to the decision criteria below.

A: The portion lifted and peeled by water immersion was less than 3 mm from the edge.
F: The portion lifted and peeled by water immersion was 3 mm or more from the edge.

<Measurement of the Volume-Average Secondary Particle Size of the Silica Particles>

Furthermore, the volume-average secondary particle size of the silica particles in the continuous void-containing layer was determined by measuring the particle size distribution using Multisizer 3 (manufactured by Beckman Coulter, Inc.) in accordance with the Coulter counter method.

<Measurement of the Increment in Thickness and the Content by Mass of the Silica Particles>

The increment in thickness due to voids in the continuous void-containing layer and the content by mass of the silica particles were calculated respectively by the expression (1) and the expression (2) described hereinabove.

<Measurement of the Film Thickness>

The film thickness was measured as the thickness of the void-containing layer with a constant pressure thickness gauge (manufactured by TECLOCK Corporation, product name "PG-02") in conformity with JIS K 7130.

Example 1

Preparation of a Coating Liquid for Forming an Adhesive Agent Layer (A)

To 100 parts by mass of an acrylic adhesive agent (trade name: "Oribain BPS-4891", manufactured by TOYOCHEM CO., LTD, solid content: 46% by mass), 2.25 parts by mass of an isocyanate-based cross-linking agent (trade name: "CORONATE L", solid content: 75% by mass, manufactured by Nippon Polyurethane Industry Co., Ltd.) and ethyl acetate were added to thereby obtain a coating liquid for forming an adhesive agent layer (A) (solid content: 37% by mass).

<Preparation of a Coating Liquid for a Continuous Void-Containing Layer (B1)>

To 100 parts by mass (solid content: 46 parts by mass) of an acrylic adhesive agent (trade name: "Oribain BPS-4891", manufactured by TOYOCHEM CO., LTD, solid content: 46% by mass), 27.6 parts by mass of silica particles (trade name: "Nipsil E-200A", volume-average secondary particle size: 3 μm, manufactured by TOSOH SILICA CORPORATION) and a mixed solvent having a volume ratio between toluene and methyl ethyl ketone (abbreviated as MEK hereafter) of 1:1 were added. The silica particles were dispersed in the acrylic adhesive agent to prepare a silica-dispersed adhesive agent composition (solid content: 37% by mass). Furthermore, to 100 parts by mass of this adhesive agent composition, 1.13 parts by mass (a solid content of 1.69 parts by mass with respect to 100 parts by mass of the acrylic adhesive agent) of an isocyanate-based cross-linking agent (trade name: "CORONATE L", solid content: 75% by mass, manufactured by Nippon Polyurethane Industry Co., Ltd.) was added, and the mixed solvent having a volume ratio between toluene and MEK of 1:1 was added to obtain a coating liquid for a continuous void-containing layer (B1) having a solid content of 33% by mass.

<Fabrication of an Adhesive Sheet>

The support substrate used was a polyethylene terephthalate film having an aluminum-deposited layer on one surface (manufactured by Lintec Corporation, product name "FNS MATTN50", thickness: 50 μm). The release sheet used was release paper [manufactured by Lintec Corporation, product name "SP-11BL Ivory", thickness: 166 μm]. The peeling-treated surface of this release sheet was subjected to three-layer simultaneous application by a multi-layer die coater using the coating liquid for forming an adhesive agent layer (A) and the coating liquid for a continuous void-containing layer (B1) such that an adhesive agent layer, a continuous void-containing layer, and an adhesive agent layer were laminated in this order, and dried at 100° C. for 2 minutes to form an adhesive agent layer having a thickness of 10 μm, a continuous void-containing layer having a thickness of 20 μm, and an adhesive agent layer having a thickness of 10 μm. These layers were bonded using a laminating roll to the aluminum-deposited surface of the support substrate to fabricate an adhesive sheet.

The content by mass of the silica particles in the continuous void-containing layer was 36.7%, and the increment in thickness due to voids was 136%.

Example 2

To 100 parts by mass (solid content: 46 parts by mass) of an acrylic adhesive agent (trade name: "Oribain BPS-4891", manufactured by TOYOCHEM CO., LTD, solid content: 46% by mass), 30.67 parts by mass of silica particles (trade name: "Nipsil E-200A", volume-average secondary particle size: 3 μm, manufactured by TOSOH SILICA CORPORATION) and a mixed solvent having a volume ratio between toluene and MEK of 1:1 were added. The silica particles were dispersed in the acrylic adhesive agent to prepare a silica-dispersed adhesive agent composition (solid content: 35% by mass). Furthermore, to 100 parts by mass of this adhesive agent composition, 1.03 parts by mass (solid content of 1.69 parts by mass with respect to 100 parts by mass of the acrylic adhesive agent) of an isocyanate-based cross-linking agent (trade name: "CORONATE L", solid content: 75% by mass, manufactured by Nippon Polyurethane Industry Co., Ltd.) was added, and the mixed solvent having a volume ratio between toluene and MEK of 1:1 was added to obtain a coating liquid for a continuous void-containing layer (B2) having a solid content of 33% by mass.

An adhesive sheet was fabricated by the same manner as in Example 1 except that the coating liquid for a continuous void-containing layer (B2) was used instead of the coating liquid for a continuous void-containing layer (B1).

The content by mass of the silica particles in the continuous void-containing layer was 39.1%, and the increment in thickness due to voids was 140%.

Example 3

To 100 parts by mass (solid content: 46 parts by mass) of an acrylic adhesive agent (trade name: "Oribain BPS-4891", manufactured by TOYOCHEM CO., LTD, solid content: 46% by mass), 37.64 parts by mass of silica particles (trade name: "Nipsil E-200A", volume-average secondary particle size: 3 μm, manufactured by TOSOH SILICA CORPORATION) and a mixed solvent having a volume ratio between toluene and MEK of 1:1 were added. The silica particles were dispersed in the acrylic adhesive agent to prepare a silica-dispersed adhesive agent composition (solid content: 33% by mass). Furthermore, to 100 parts by mass of this adhesive agent composition, 0.89 parts by mass (solid content of 1.69 parts by mass with respect to 100 parts by mass of the acrylic adhesive agent) of an isocyanate-based cross-linking agent (trade name: "CORONATE L", solid content: 75% by mass, manufactured by Nippon Polyurethane Industry Co., Ltd.) was added, and the mixed solvent having a volume ratio between toluene and MEK of 1:1 was added to obtain a coating liquid for a continuous void-containing layer (B3) having a solid content of 33% by mass.

An adhesive sheet was fabricated by the same manner as in Example 1 except that the coating liquid for a continuous void-containing layer (B3) was used instead of the coating liquid for a continuous void-containing layer (B1).

The content by mass of the silica particles in the continuous void-containing layer was 44.1%, and the increment in thickness due to voids was 145%.

Example 4

The support substrate used was "FNS MATTN50" (aforementioned), and the release sheet used was release paper [manufactured by Lintec Corporation, product name "SP-8LK Blue", thickness: 88 μm]. The coating liquid for an adhesive agent layer (A) was applied on the peeling-treated surface of this release sheet by a roll coater and dried at 100° C. for one minute to form an adhesive agent layer having a thickness of 10 μM. The layer was bonded using a laminating roll to the aluminum-deposited surface of the support substrate to fabricate an adhesive sheet (I).

Subsequently, the peeling-treated surface of release paper "SP-11BL Ivory" (aforementioned) was subjected to simultaneous application by a two-layer die coater using the coating liquid for an adhesive agent layer (A) and the coating liquid for a continuous void-containing layer (B1) such that an adhesive agent layer and a continuous void-containing layer were laminated in this order from the peeling-treated surface and dried at 100° C. for two minutes to form an adhesive agent layer having a thickness of 10 μm and a continuous void-containing layer having a thickness of 20 The release paper "8LK Blue" (aforementioned) on the adhesive sheet (I) was peeled off, and the adhesive surfaces were bonded to each other using a laminating roll to fabricate an adhesive sheet.

The content by mass of the silica particles in the continuous void-containing layer was 36.7%, and the increment in thickness due to voids was 136%.

Example 5

The coating liquid for continuous void-containing layer (B1) was applied by a roll coater on the peeling-treated surface of the release paper "SP-11BL Ivory" (aforementioned) and dried at 100° C. for one minute to form a continuous void-containing layer containing continuous voids and having a thickness of 20 μm. The peeling-treated surface of release paper "8LK Blue" (aforementioned) was bonded to the layer using a laminating roll to fabricate an adhesive sheet (II).

Furthermore, the coating liquid for an adhesive agent layer (A) was applied on the peeling-treated surface of release paper [manufactured by Lintec Corporation, product name "SP-10NL White", thickness: 153 μm] by a roll coater and dried at 100° C. for one minute to form an adhesive agent layer having a thickness of 10 μm. The peeling-treated surface of release paper [manufactured by Lintec Corporation, product name "SP-7LK White", thickness: 76 µm] was bonded to the layer using a laminating roll to fabricate an adhesive sheet (III).

The release paper "SP-8LK Blue" (aforementioned) of the adhesive sheet (II) obtained and the release paper "SP-8LK Blue" of the adhesive sheet (I) were peeled off, and the surfaces from which the release paper was peeled were boned to each other to fabricate an adhesive sheet (IV). Subsequently, the release paper "SP-11BL Ivory" of the adhesive sheet (IV) and the release paper "SP-7LK White" of the adhesive sheet (III) were peeled off, and the surfaces from which the release paper was peeled were bonded to each other to fabricate an adhesive sheet.

The content by mass of the silica particles in the continuous void-containing layer was 36.7%, and the increment in thickness due to voids was 136%.

Example 6

To 100 parts by mass (solid content: 46 parts by mass) of an acrylic adhesive agent (trade name: "Oribain BPS-4891", manufactured by TOYOCHEM CO., LTD, solid content: 46% by mass), 27.6 parts by mass of silica particles (trade name: "Nipsil E-200A", volume-average secondary particle size: 3 µm, manufactured by TOSOH SILICA CORPORATION) and a mixed solvent having a volume ratio between toluene and MEK of 1:1 were added. The silica particles were dispersed in the acrylic adhesive agent to prepare a silica-dispersed adhesive agent composition (solid content: 37% by mass). Furthermore, to 100 parts by mass of this silica-dispersed adhesive agent composition, 1.13 parts by mass (a solid content of 1.69 parts by mass with respect to 100 parts by mass of the acrylic adhesive agent) of an isocyanate-based cross-linking agent (trade name: "CORONATE L", solid content: 75% by mass, manufactured by Nippon Polyurethane Industry Co., Ltd.) and the mixed solvent having a volume ratio between toluene and MEK of 1:1 were added to obtain a silica dispersion liquid having a solid content of 33% by mass.

Furthermore, to 85 parts by mass of this silica dispersion liquid, 15 parts by mass (solid content: 18.52 parts by mass with respect to 100 parts by mass of the acrylic adhesive agent used in the silica-dispersed adhesive agent composition aforementioned) of an acrylic adhesive agent (trade name: "Oribain BPS-4891", manufactured by TOYOCHEM CO., LTD, solid content: 46% by mass), 1.30 parts by mass (solid content: 2.62 parts by mass with respect to 100 parts by mass of the acrylic adhesive agent used in the silica-dispersed adhesive agent composition aforementioned) of isocyanate-based cross-linking agent (trade name: "CORONATE L", solid content: 75% by mass, manufactured by Nippon Polyurethane Industry Co., Ltd.) was added, and the mixed solvent having a volume ratio between toluene and MEK of 1:1 was added to obtain a coating liquid for a continuous void-containing layer (B4) having a solid content of 35% by mass.

An adhesive sheet was fabricated by the same manner as in Example 1 except that the coating liquid for a continuous void-containing layer (B4) was used instead of the coating liquid for a continuous void-containing layer (B1).

The content by mass of the silica particles in the continuous void-containing layer was 28.6%, and the increment in thickness due to voids was 125%.

Example 7

An adhesive sheet was fabricated in the same manner as in Example 1 except that a coating liquid for a continuous void-containing layer (B5) in which the amount of silica particles (trade name: "Nipsil E-200A", volume-average secondary particle size: 3 µm, manufactured by TOSOH SILICA CORPORATION) blended was changed from 27.6 parts by mass to 56.22 parts by mass was used in preparation of the coating liquid for a void-containing layer (B1) in Example 1.

The content by mass of the silica particles in the continuous void-containing layer was 53.8%, and the increment in thickness due to voids was 164%.

Comparative Example 1

The coating liquid for an adhesive agent layer (A) was applied on the peeling-treated surface of the release paper "SP-11BL Ivory" (aforementioned) with a roll coater and dried at 100° C. for one minute to form an adhesive agent layer having a thickness of 40 µm. The layer was bonded using a laminating roll to the aluminum-deposited surface of the support substrate "FNS MATTN50" (aforementioned) to fabricate an adhesive sheet.

The content by mass of the silica particles in the adhesive agent layer of this adhesive sheet was 0%, and the increment in thickness due to voids was 100%.

Comparative Example 2

An adhesive sheet was fabricated in the same manner as in Example 1 except that a coating liquid for a continuous void-containing layer (B6) containing titanium oxide particles ("TIPAQUE CR97", manufactured by ISHIHARA SANGYO KAISHA, LTD., average particle size: 0.25 µm) was used instead of the silica particles in preparation of the coating liquid for a void-containing layer (B1) in Example 1.

The content by mass of the silica particles in the continuous void-containing layer was 0%, and the increment in thickness due to voids was 100%.

Comparative Example 3

To 100 parts by mass (solid content: 46 parts by mass) of an acrylic adhesive agent (trade name: "Oribain BPS-4891", manufactured by TOYOCHEM CO., LTD, solid content: 46% by mass), 27.6 parts by mass of silica particles (trade name: "Nipsil E-200A", volume-average secondary particle size: 3 µm, manufactured by TOSOH SILICA CORPORATION) and a mixed solvent having a volume ratio between toluene and MEK of 1:1 were added. The silica particles were dispersed in the acrylic adhesive agent to prepare a silica-dispersed adhesive agent composition (solid content: 37% by mass). Furthermore, to 100 parts by mass of this silica-dispersed adhesive agent composition, 1.13 parts by mass (a solid content of 1.69 parts by mass with respect to 100 parts by mass of the acrylic adhesive agent) of an isocyanate-based cross-linking agent (trade name: "CORONATE L", solid content: 75% by mass, manufactured by Nippon Polyurethane Industry Co., Ltd.) was added, and the mixed solvent having a volume ratio between toluene and MEK of 1:1 was added to obtain a silica dispersion liquid having a solid content of 33% by mass.

Furthermore, to 70 parts by mass of this silica dispersion liquid, 30 parts by mass (solid content: 45 parts by mass with respect to 100 parts by mass of the acrylic adhesive agent used in the silica-dispersed adhesive agent composition aforementioned) of an acrylic adhesive agent (trade name: "Oribain BPS-4891", manufactured by TOYOCHEM CO., LTD, solid content: 46% by mass), 1.47 parts by mass (solid content: 2.62 parts by mass with respect to 100 parts by mass of the acrylic adhesive agent used in the silica-dispersed adhesive agent composition aforementioned) of an isocyanate-based cross-linking agent (trade name: "CORONATE L", solid content: 75% by mass, manufactured by Nippon Polyurethane Industry Co., Ltd.) was added, and the mixed solvent having a volume ratio between toluene and MEK of 1:1 was added to obtain a coating liquid for a continuous void-containing layer (B7) having a solid content of 37% by mass.

An adhesive sheet was fabricated by the same manner as in Example 1 except that the coating liquid for a continuous void-containing layer (B7) was used instead of the coating liquid for a continuous void-containing layer (B1).

The content by mass of the silica particles in the continuous void-containing layer was 22.3%, and the increment in thickness due to voids was 114%.

Comparative Example 4

An adhesive sheet was fabricated in the same manner as in Example 1 except that a coating liquid for a continuous void-containing layer (B8) in which the amount of silica particles (trade name: "Nipsil E-200A", volume-average secondary particle size: 3 μm, manufactured by TOSOH SILICA CORPORATION) blended was changed from 27.6 parts by mass to 75.05 parts by mass was used in preparation of the coating liquid for a void-containing layer (B1) in Example 1.

The content by mass of the silica particles in the continuous void-containing layer was 60.6%, and the increment in thickness due to voids was 172%.

The blister-resistance and the water resistance of the adhesive sheet obtained in each example above were evaluated. The results are shown in Table 1 together with the content by mass of the silica particles in the continuous void-containing layer and the increment in thickness due to voids.

TABLE 1

| | Content by mass of the silica particles (%) | Increment in thickness due to voids (%) | Blister resistance on PMMA | Blister resistance on PC | Blister resistance on PS | Water resistance |
|---|---|---|---|---|---|---|
| Example 1 | 36.7 | 136 | A | A | A | A |
| Example 2 | 39.1 | 140 | A | A | A | A |
| Example 3 | 44.1 | 145 | A | A | A | A |
| Example 4 | 36.7 | 136 | A | A | A | A |
| Example 5 | 36.7 | 136 | A | A | A | A |
| Example 6 | 28.6 | 125 | A | B | A | A |
| Example 7 | 53.8 | 164 | A | A | A | A |
| Comparative Example 1 | 0 | 100 | C | C | C | A |
| Comparative Example 2 | 0 | 100 | C | C | C | A |
| Comparative Example 3 | 22.3 | 114 | C | C | B | A |
| Comparative Example 4 | 60.6 | 172 | A | A | A | F |

PMMA: Polymethyl methacrylate,
PC: Polycarbonate,
PS: Polystyrene

Figure 2:
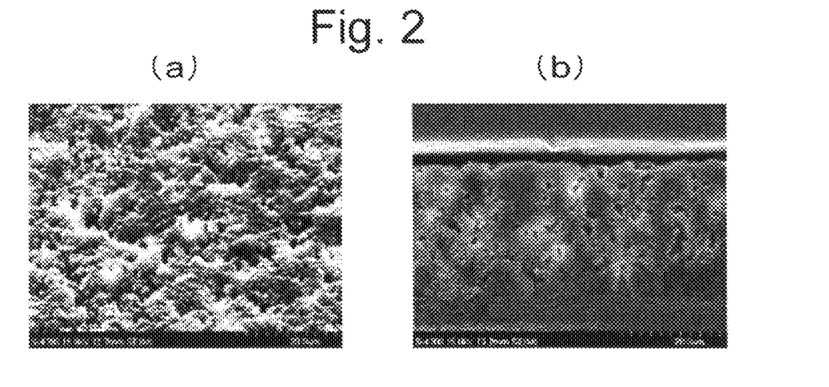
FIG. 2 is electron microscope images of a continuous void-containing layer formed in Example 5 (the content by mass of silica particles: 36.7%): (a) is a surface image, and (b) is a cross-sectional image.

Furthermore, the electron microscope images of the continuous void-containing layer formed in Example 5 (the content by mass of silica particles: 36.7%) are shown in FIG. 2. (a) is a surface image, and (b) is a cross-sectional image.

Figure 3:
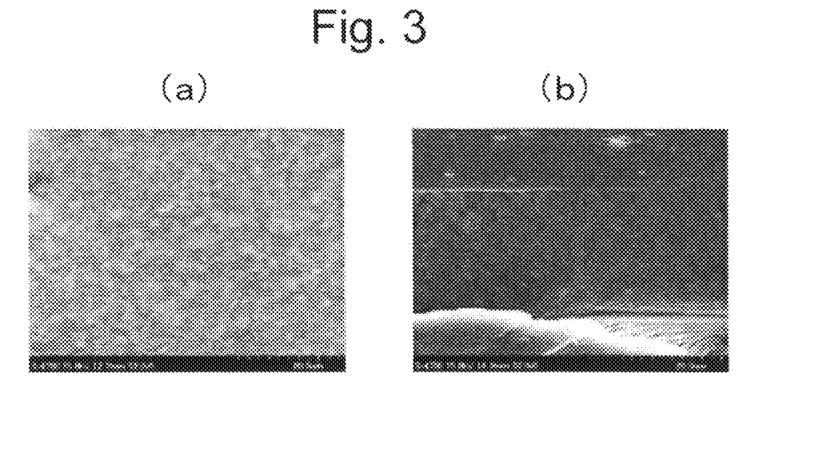
FIG. 3 is electron microscope images of a layer formed in Comparative Example 3 (the content by mass of silica particles: 22.3%): (a) is a surface image, and (b) is a cross-sectional image.

The electron microscope images of the layer formed in Comparative Example 3 (the content by mass of silica particles: 22.3%) are shown in FIG. 3. (a) is a surface image, and (b) is a cross-sectional image.

The surface of the surface image in FIG. 2(a) is the exposed surface at drying, not the release sheet side.

Continuous voids have been formed in Example 5, whereas no continuous voids have been formed in Comparative Example 3 (the content by mass of silica particles: 22.3%).

It is to be noted that observation was carried out using a field emission scanning electron microscope "S-4700" manufactured by Hitachi, Ltd. at an accelerating voltage of 15 kV and a magnification of 2000.

INDUSTRIAL APPLICABILITY

The adhesive sheet of the present invention, when affixed to the surface of various plastic molded articles, prevents swelling or lifting, in other words, blistering after a lapse of time to allow the surface of its support substrate to be smooth and to have an excellent appearance. The adhesive sheet can exhibit excellent blister resistance regardless of the type of adhesive agent, and is furthermore easy to manufacture.

REFERENCE SIGNS LIST

1 Support substrate
2 Metal layer
3 Adhesive agent layer (X)
4 Continuous void-containing layer
5 Adhesive agent layer (Y)
6 Release sheet
10 Adhesive sheet

The invention claimed is:
1. An adhesive sheet, comprising:
    a support substrate;
    a first adhesive agent layer;
    a continuous void-containing layer comprising an adhesive agent and silica particles; and
    a second adhesive agent layer,
    wherein the support substrate, the first and second adhesive agent layers, and the continuous void-containing layer are laminated in an order of the support substrate, the first adhesive agent layer, the continuous void-containing layer, and the second adhesive agent layer, and
    the silica particles are included in the continuous void-containing layer in an amount of from 25 to 60% by mass.
2. The adhesive sheet according to claim 1, wherein an increment in thickness due to voids of the continuous void-containing layer is from 120 to 170%.
3. The adhesive sheet according to claim 1, wherein the silica particles in the continuous void-containing layer have a volume-average secondary particle size of 0.5 to 10 μm.
4. A method for manufacturing the adhesive sheet according to claim 1, the method comprising:
    simultaneously applying at least two of the first adhesive agent layer, the continuous void-containing layer, and the second adhesive agent layer to the support substrate by a multi-layer coater.
5. A method for manufacturing the adhesive sheet according to claim 1, the method comprising:

laminating each of the first adhesive agent layer, the continuous void-containing layer, and the second adhesive agent layer on the support substrate by bonding.

6. The adhesive sheet according to claim 2, wherein the silica particles in the continuous void-containing layer have a volume-average secondary particle size of 0.5 to 10 µm.

7. A method for manufacturing the adhesive sheet according to claim 2, the method comprising:
simultaneously applying at least two of the first adhesive agent layer, the continuous void-containing layer, and the second adhesive agent layer to the support substrate by a multi-layer coater.

8. A method for manufacturing the adhesive sheet according to claim 3, the method comprising:
simultaneously applying at least two of the first adhesive agent layer, the continuous void-containing layer, and the second adhesive agent layer to the support substrate by a multi-layer coater.

9. A method for manufacturing the adhesive sheet according to claim 2, the method comprising:
laminating each of the first adhesive agent layer, the continuous void-containing layer, and the second adhesive agent layer on the support substrate by bonding.

10. A method for manufacturing the adhesive sheet according to claim 3, the method comprising:
laminating each of the first adhesive agent layer, the continuous void-containing layer, and the second adhesive agent layer on the support substrate by bonding.

11. The adhesive sheet according to claim 1, wherein the support substrate comprises a plastic film and a metal layer.

12. The adhesive sheet according to claim 11, wherein the plastic film comprises at least one selected from the group consisting of polyethylene terephthalate, polybutylene terephthalate, polyethylene naphthalate, polyethylene, polypropylene, polyvinyl chloride, polyvinylidene chloride, polyvinyl alcohol, an ethylene-vinyl acetate copolymer, polystyrene, polycarbonate, polymethylpentene, polysulfone, polyether ether ketone, polyether sulfone, polyphenylene sulfide, polyether imide, polyimide, a fluorine resin, polyamide, an acrylic resin, a norbornene-based resin, and a cycloolefin resin.

13. The adhesive sheet according to claim 11, wherein the metal layer comprises at least one selected from the group consisting of aluminum, tin, chromium, and titanium.

14. The adhesive sheet according to claim 1, wherein the support substrate comprises a plastic film and a metal layer such that the first adhesive agent layer is laminated on the metal layer of the support substrate.

15. The adhesive sheet according to claim 1, wherein the silica particles are included in the continuous void-containing layer in an amount of from 30 to 50% by mass.

16. The adhesive sheet according to claim 11, wherein the plastic film has a thickness of from 5 to 200 µm.

17. The adhesive sheet according to claim 1, wherein the continuous void-containing layer has a thickness of from 5 to 100 µm.

18. The adhesive sheet according to claim 1, wherein the continuous void-containing layer has a composition different from compositions of the first and second adhesive agent layers.

19. The adhesive sheet according to claim 1, wherein each of the first and second adhesive agent layers has a thickness of from 5 to 50 µm.

20. The adhesive sheet according to claim 1, further comprising:
a release sheet laminated on the second adhesive agent layer on a side opposite to the continuous void-containing layer.

* * * * *